United States Patent [19]
Gelfand

[11] Patent Number: 4,518,461
[45] Date of Patent: May 21, 1985

[54] SUPPORT FOR BATTERIES OF COKING FURNACES HEATED FROM THE TOP

[75] Inventor: Jan Gelfand, Ratingen-Lintorf, Fed. Rep. of Germany

[73] Assignee: Krupp-Koppers GmbH, Essen, Fed. Rep. of Germany

[21] Appl. No.: 471,142

[22] Filed: Mar. 1, 1983

[30] Foreign Application Priority Data

Mar. 20, 1982 [DE] Fed. Rep. of Germany ....... 3210372

[51] Int. Cl.³ ..................... C10B 29/00; C10B 45/00
[52] U.S. Cl. ...................................... 202/270; 52/167; 202/111; 202/267 R; 202/268
[58] Field of Search ............ 202/267 R, 268, 270, 202/133, 111; 52/167

[56] References Cited

U.S. PATENT DOCUMENTS

| | | | |
|---|---|---|---|
| 2,761,827 | 9/1956 | Ackeren | 202/268 |
| 4,226,677 | 10/1980 | Saito et al. | 202/270 |
| 4,353,189 | 10/1982 | Thiersch et al. | 52/167 |

FOREIGN PATENT DOCUMENTS 2460906 7/1976 Fed. Rep. of Germany ...... 202/268

Primary Examiner—Jay H. Woo
Assistant Examiner—Mike McGurk
Attorney, Agent, or Firm—Michael J. Striker

[57] ABSTRACT

A support for a battery of coking furnaces with regenerators has a plurality of waste heat passages formed beneath the regenerators and extending in a longitudinal direction of the battery, a foundation formed by a floor member and also by wall members of the waste heat passages, a further supporting plate slidingly supported on the walls and repeatedly subdivided transversely to the longitudinal direction of the battery so as to form a plurality of plate portions, and two longitudinal bars each located at a machine side and at a coke side of the battery and slidingly supported on consoles of the foundation, wherein each of the longitudinal bars engages the plate portions of the furnace supporting plate and fixes them in their positions.

12 Claims, 1 Drawing Figure

U.S. Patent
May 21, 1985
4,518,461
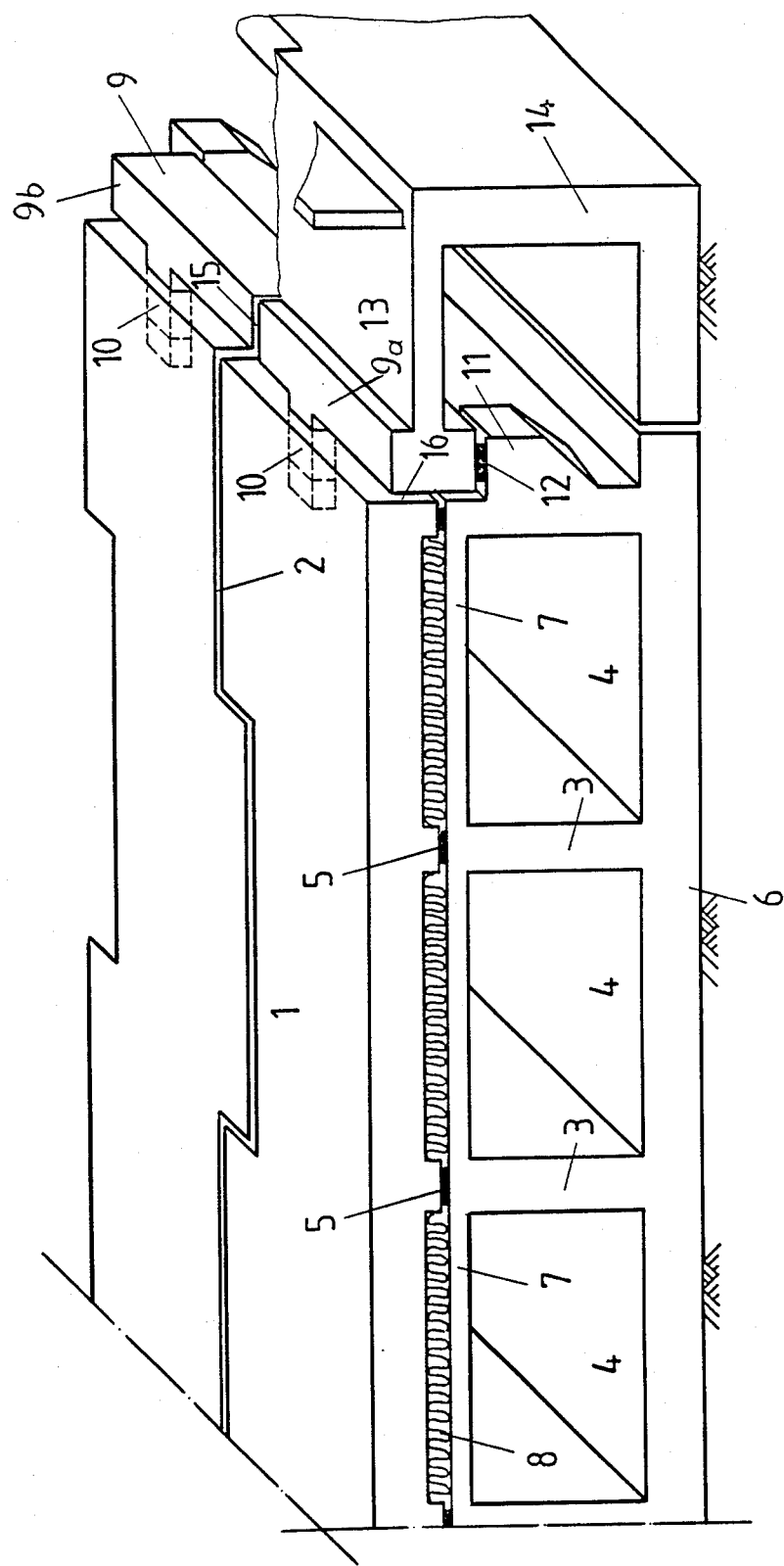

SUPPORT FOR BATTERIES OF COKING FURNACES HEATED FROM THE TOP

BACKGROUND OF THE INVENTION

The present invention relates to a support for a battery of coking furnaces heated from the top, the support having a plurality of waste heat passages extending underneath regenerators in the longitudinal direction of the battery.

Supports of the above-mentioned general type are known in the art. In known supports, the walls of the waste heat passages are covered with red bricks, and the upper closure is formed as an arch. The refractory brickwork of the regenerators stands on the arch. The red brickwork stands on a through-going steel concrete foundation plate. Although in the past the red brickwork completely satisfied the requirements of the effectiveness and operability, it is no longer satisfactory in the present. Increasing wages make the wage-intensive red brick supports un-economical. Because of increased number of furnaces in batteries of increased length, the red brick supports, despite expansion joints, can assume a certain inclined position relative to regenerator walls from the center of the battery toward the end heads, as a result of a heat expansion in the longitudinal axis of the battery. Since the development in construction of coke furnaces has a tendency to produce longer batteries, the requirement of the parallelism of the regenerator walls together with the effectiveness move to the foreground. The known red brickwork has sufficient rigidity to protect the setting-susceptible refractory masonry of the regenerator, particularly the heating walls, from undesirable deformations because of the structure. However, the rigidity of the red brickwork depends considerably upon the thickness of the steel concrete foundation plate located therebelow. In the case when a relatively thin foundation plate with the entire thickness of only 55–65 cm is made, the expected rigidity of the support is no longer attained in reality to a full degree. As can be observed in old coking oven batteries after heating, such thin steel concrete foundation plates are deformed relatively strongly under the action of heat, bottom setting and/or rock lowering. The thinner are designed the foundation plates, the higher are the unevenness of the latter. The red brick support extensively follows the deformations. It has been shown that, in the known constructions, the steel concrete foundation plate and the red brickwork located thereabove have an added and non-cooperating rigidity. Since the development in the coking furnaces always has a tendency to construct higher furnaces, the protection of the refractory masonry against deformation because of the structure base movements is connected with high requirements as to the rigidity, as was the case up to now.

SUMMARY OF THE INVENTION

Accordingly, it is an object of the present invention to provide a support for a battery of coking furnaces heated from the top, which avoids the disadvantages of the prior art.

More particularly, it is an object of the present invention to provide a support for a battery of coking furnaces heated from the top which, even in the event of the utilization of high coking furnaces, guarantees a sufficient rigidity.

In keeping with these objects and with others which will become apparent hereinafter, one feature of the present invention resides, briefly stated, in a support in which a foundation is formed of a floor member and also of walls of spaced heat passages, a furnace supporting plate rests on the walls and is repeatedly subdivided transversely to a longitudinal direction of the battery, and a longitudinal bar is arranged at a machine side and at a coke side of the battery and slidingly lies on consoles of the foundation, wherein the longitudinal parts engage with individual portions of the furnace supporting plate and fix them in their positions.

When the support is designed in accordance with the present invention, it attains the objects mentioned above.

The novel features which are considered characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view showing a support for a battery of coking furnaces heated from the top.

DESCRIPTION OF A PREFERRED EMBODIMENT

A furnace supporting plate composed of steel concrete is identified with reference numeral 1 and carries a refractory masonry of a regenerator. The furnace supporting plate 1 is subdivided by expansion joints or gaps 2 into a plurality of individual plate portions. The plate portions lie on vertical walls 3 of waste heat passages 4, the walls 3 being composed of steel concrete.

Friction bearings 5 are arranged between the plate portions of the furnace supporting plate 1 and the walls 3 of the waste heat passages 4. The walls 3 are connected with one another by a throughgoing foundation plate 6 of steel concrete, which simultaneously forms a floor of the waste heat passages 4. To prevent entrance of gas, the waste heat passages 4 are closed by a top 7 of steel concrete. The top 7 serves simultaneously for horizontal reinforcement in the transverse direction of the battery. A free space remains between the top 7 and the furnace supporting plate 1. This free space is filled with a heat insulating material 8.

Because of this heat insulating material, only small temperature drops inside the steel concrete furnace supporting plate 1 are guaranteed, with the consideration of the plate is important for its efficiency. The wall 3 and the foundation plate 6 form the foundation body proper of the coke furnace battery. Its entire height depends on the size of the cross section of the waste heat passages 4. The foundation body has a very high rigidity.

The individual plate portions of the plate 1 can expand from their center freely into the expansion gaps 2 under the action of heating during the heating process. Their expansion substantially depends upon the temperature of the regenerator or heating passages above the plate 1.

The foundation body 3 with the waste heat passages 4 integrated therein can expand under the action of heat freely from the center of the battery to the end heads during the heating-up. Its heat expansion depends on the temperature in the waste heat passages 4. The average temperature of the foundation body 3, 6 as a rule differs from the temperature of the furnace supporting plate. Since during operation the temperature of the waste gas in the waste heat passages 4 as a rule is higher than the temperature of the regenerator above the furnace supporting plate 1, and moreover the foundation body in contrast to the furnace supporting plate 1 has no or only few expansion gaps, it can be expected that the foundation body expands more than the furnace supporting plate 1. Because of the narrow arrangement of the gaps 2, the furnace supporting plate 1 after heating, as considered over the entire length of the bottom, remains with the original manufactured mass. To the contrary, the foundation body assumes an increased mass which depends upon the battery length, the temperature of the waste heat passages 4, and the number of their expansion gaps.

For guaranteeing that the foundation body during its heat expansion does not pull along the portions of the steel concrete furnace supporting plate 1, in other words does not slide from the battery center in direction toward the end heads, the plate portions of the plate 1 are held by a longitudinal support 9 and by pins 10 extending into hollow spaces of the individual portions, in their initial position. The longitudinal support lies on the consoles 11 of the foundation body, whereby a gap 16 remains between the longitudinal support and the foundation body.

Friction bearings 12 are arranged between the longitudinal support 9 and the foundation body. For guaranteeing that the pins 10 retain their original position prior to the heating and are not displaced from the friction bearings 5 and 12 either during small heating of the longitudinal support 9 or by the horizontal friction force, the longitudinal support 9 or bar is subdivided by gaps 15 in correspondence with the gaps 2 into portions of which portions 9a and 9b are shown in the drawing. Thereby simultaneously an efficient dimension of the longitudinal support is guaranteed. The longitudinal support 9 is connected by a horizontal steel concrete plate 13 which forms an operators' space in a steel concrete outer wall 14 of the walking passage.

The added friction forces from the expansion of the foundation body during heating pass through the individual portions of the longitudinal support or bar 9 and the plate 13 in the outer wall 14. The outer wall 14 is loaded symmetrically with axial force from the center of the battery to the end heads. Since the outer wall 14 retains its original manufacturing mass up to small longitudinal change because of axial force and cannot be displaced in the direction of longitudinal axis of the battery because of the symmetry of the forces, it is guaranteed that the individual portions of the plate 1 retain in their original position regardless of the expansion of the foundation body. Thereby it is also guaranteed that this cannot lead to an inclined position of the regenerator walls under the action of heat expansion of the understructure.

After the expansion of the battery at the end of the heating process, the friction forces disappear. During operation, or in other words during the entire service life of the battery, also no friction forces from the heat expansion of the foundation take place. During heating, the horizontal forces take place with the same value as described hereinabove, but with opposite sign. In other words instead of pulling forces now pressing forces take place in the longitudinal support 9 and in the outer wall 14.

The steel concrete furnace supporting plate 1 and the foundation body 3, 6 can be formed both with conventional singly reinforced steel concrete massive structure, and partially or completely of prestressed concrete, as well as partially prefabricated reinforced concrete parts. The longitudinal support 9 and the plate 13 of the operators' space can be formed both as concrete support, and as steel support, or as a composite structure.

The friction bearings 5 and 12 can be formed both as steel plates (upper and lower steel plates) with suitable conventional lubricant therebetween for reducing the friction value, and as Teflon- or roller bearings.

The space between the top 7 of the waste heat passage and the upper plate 1 can be used both for the heat insulation 8, and as an air passage for cooling in some cases.

Instead of or in combination with the force transmission from the longitudinal bar 9 via the plate 13 to the outer wall 14, the axial forces of the individual portions of the longitudinal bar 9 can pass via suitable springs inserted into the expansion gaps 15 to the massive end heads of the battery. In this case it is possible to compensate by the springs the relatively small heat expansion of the longitudinal bar 9 and simultaneously to determine the axial pressure so that the longitudinal changes of the longitudinal bar under the action of heat and of axial force are directed oppositely.

It will be understood that each of the elements described above, or two or more together, may also find a useful application in other types of constructions differing from the types described above.

While the invention has been illustrated and described as embodied in a support for a battery of coking furnaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination a battery of coking furnaces of the type being heated from the top and having regenerators, and a support for said battery comprising
   a plurality of waste heat passages formed beneath the regenerators and extending in a longitudinal direction of the battery;
   a foundation formed by a floor member and also by wall members of said waste heat passages, and having a plurality of consoles;
   a furnace supporting plate slidingly supported on said wall members and repeatedly subdivided transversely to the longitudinal direction of the battery so as to form a plurality of plate portions; and
   two longitudinal bars each located at a machine side and at a coke side of the battery and slidingly supported on said plurality of consoles of said foundation, each of said longitudinal bars engaging said plate portions of said furnace supporting plate and fixing them in their positions.

2. The combination as defined in claim 1; and further comprising a plurality of friction bearings arranged between said furnace supporting plate and said wall members, and also between said longitudinal bars and said plurality of consoles of said foundation.

3. The combination as defined in claim 1, wherein said foundation and said furnace supporting plate are composed of steel concrete.

4. The combination as defined in claim 1, wherein said waste heating passages have a closing top member arranged so that a space remains between said closing top member and said furnace supporting plate.

5. The combination as defined in claim 4, wherein said space between said closing top member and said furnace supporting plate is filled with heat insulating material.

6. The combination as defined in claim 4, wherein said space between said closing top member and said furnace supporting plate remains as a free space for cooling.

7. The combination as defined in claim 1, wherein said plate portions of said furnace supporting plate are arranged so that gaps remain therebetween.

8. The combination as defined in claim 1, furnace supporting wherein said plate portions are provided with hollow spaces, each of said longitudinal bars having a plurality of projections engaging into said hollow spaces of said plate portions.

9. The combination as defined in claim 1, wherein said longitudinal bars are arranged so that gaps remain between each of said longitudinal bars and said plate portions of said furnace supporting plate.

10. The combination as defined in claim 1, wherein each of said longitudinal bars is subdivided into a plurality of bar portions in correspondence with the subdivision of said plate portions of said furnace supporting plate and said bar portions having gaps therebetween.

11. The combination as defined in claim 10; and further comprising two connecting plates each forming an outer wall of a walking passage and connecting said bar portions of a respective one of said longitudinal bars with one another.

12. The combination as defined in claim 10; and further comprising a plurality of springs arranged in said gaps between said bar portions of said longitudinal bars so as to firmly tighten ends of said longitudinal bars.

* * * * *